(12) United States Patent
Randmaa et al.

(10) Patent No.: US 6,856,953 B1
(45) Date of Patent: Feb. 15, 2005

(54) METHOD AND SYSTEM FOR TESTING ALGORITHM COMPLIANCY

(75) Inventors: Matthew Randmaa, Santa Barbara, CA (US); Murali Anantha, Santa Barbara, CA (US); David Lindsay, Santa Barbara, CA (US); Keith Dillon, Santa Barbara, CA (US)

(73) Assignee: GlobespanVirata, Inc., Red Bank, NJ (US)

( * ) Notice: Subject to any disclaimer, the term of this patent is extended or adjusted under 35 U.S.C. 154(b) by 596 days.

(21) Appl. No.: 10/021,064

(22) Filed: Dec. 19, 2001

(51) Int. Cl.$^7$ .......................... G10L 11/00; G06F 11/00
(52) U.S. Cl. .................. 704/200; 704/201; 704/270; 714/38
(58) Field of Search .................. 714/37–39; 704/200, 704/201, 234, 252, 270; 370/334, 397; 710/266

(56) References Cited

U.S. PATENT DOCUMENTS

| | | | |
|---|---|---|---|
| 5,022,024 A | * 6/1991 | Paneth et al. | ............... 370/334 |
| 5,125,022 A | * 6/1992 | Hunt et al. | ............... 704/252 |
| 5,241,649 A | * 8/1993 | Niyada | ............... 704/234 |
| 5,944,816 A | 8/1999 | Dutton et al. | |
| 6,130,889 A | 10/2000 | Feldman et al. | |
| 6,205,414 B1 | 3/2001 | Forsman et al. | |
| 6,249,881 B1 | 6/2001 | Porten et al. | |
| 6,324,411 B1 | * 11/2001 | Genell | ............... 455/561 |

* cited by examiner

Primary Examiner—David D. Knepper
(74) Attorney, Agent, or Firm—Hunton & Williams (57) ABSTRACT

The present invention relates to an algorithm for ensuring compliancy of an algorithm module when integrated in a real time software system. The compliancy tests may include a memory test, interrupt test, latency test and other tests, as well as combinations thereof. An inventive aspect of the present invention relates to a unit test harness for verifying that a software algorithm module meets performance and functional requirements when integrated in a complete real-time software system. A software algorithm module eliminates or reduces unwanted behavior by the caller or other software on a real-time software system due to incorrect operations, which may involve interrupts, memory usage, register usage and/or other factors.

29 Claims, 12 Drawing Sheets

| Number of vCore sections 910 |
|---|
| Section 1: Start address 912 |
| Length of the section 1 914 |
| Section 2: Start address 916 |
| Length of section 2 918 |

METHOD AND SYSTEM FOR TESTING ALGORITHM COMPLIANCY

FIELD OF THE INVENTION

The present invention relates generally to a compliancy test of an algorithm, more particularly, to a method and system for ensuring compliancy of an algorithm module when integrated in a real time software system wherein a plurality of tests, such as a memory test, interrupt test, latency test and other tests, may be performed.

BACKGROUND OF THE INVENTION

When an algorithm module is tested to meet various performance requirements and criteria, this testing is usually performed in a single-channel mode where test software dedicated to the execution and verification of the algorithm module is implemented. Generally, no additional processing is performed by the microprocessor in testing the algorithm. Traditional unit testing may verify that the algorithm meets various performance and/or functional requirements. However, when the algorithm is used in a complete system design, the algorithm is no longer an isolated process on a dedicated microprocessor. Oftentimes, the environment may introduce additional characteristics and factors that have not been tested or considered in traditional unit testing.

For example, the presence of Interrupt Service Routines (ISR) may cause the algorithm to be interrupted. ISR generally refers to a software routine that is activated to respond to an interrupt. The status of various registers prior to a call to an algorithm may be different than they were in the unit testing. In addition, scratch space used by the algorithm is likely to be modified by other processes executing between calls to the algorithm. This is less likely to occur in unit testing where the algorithm is isolated. If the algorithm does not restore registers correctly upon return, a caller in a system design may be affected whereas the unit test software may not be affected. If the algorithm modifies memory not allocated, a system design is more likely to be affected since much of the processor's memory is unused during unit testing. These types of problems as well as other problems are costly when not discovered or addressed until a system test. They are even more costly if not identified until a general release.

Therefore, there is a need in the art of compliancy testing for a more efficient method and system for testing algorithms for proper functioning in a real-time software system or environment.

SUMMARY OF THE INVENTION

Aspects of the present invention overcome the problems noted above, and realize additional advantages. One such inventive aspect provides a unit test harness for verifying that a software algorithm module meets performance and functional requirements when integrated in a complete real-time software system.

According to another aspect of the present invention, a software algorithm module eliminates or reduces unwanted behavior by the caller or other software on a real-time software system due to incorrect operations, which may involve interrupts, memory usage, register usage and/or other factors.

According to an embodiment of the present invention, a method for testing a voice algorithm module for compliancy in a voice framework comprises the steps of filling a scratch memory location with a predetermined fill pattern associated with a function to be tested, saving context information to a predetermined memory location, wherein the context information is specific to the function and is to be preserved for a call to the function wherein the context information comprises at least one variable required for a subsequent call to the function; configuring a timer interrupt to interrupt the function after each cycle to minimize pipeline conflicts; calling the function; verifying context information by comparing a current version of the context information with the saved version of the context information; and writing an error code to an output file based on the verification of context information.

Other aspects of an embodiment of the present invention include the step of placing a predetermined number of patterns in a predetermined number of adjacent words on the stack; after the call to the function, checking that the predetermined words have a same relative address to top of the stack, wherein context information comprises at least one of status registers, general purpose registers and stack pointers; wherein the step of verifying context information further comprises the step of verifying status registers by comparing status registers with saved context information; wherein the step of verifying context information further comprises the step of verifying general purpose registers by comparing general purpose registers with saved context information; wherein the step of verifying context information further comprises the step of verifying allocated scratch space was used by comparing the scratch space and the fill pattern; wherein the fill pattern is a 16-bit pattern; wherein pipeline conflicts arises when executing a plurality of instructions in an assembly line manner; further comprising the step of performing memory test initialization steps; further comprising the steps of saving a return value associated with the function and comparing the return value with a plurality of known values of a maintained data file that represents correct values of the function called; wherein the step of configuring a timer interrupt further comprises the steps of initializing a timer in a time control register; updating a program counter of an interrupted line of a code, for comparison with a previous value of the program counter; and generating an interrupt for each line of code of the function based on an expiration of the timer.

According to another embodiment of the present invention, a method for testing a voice algorithm module for compliancy in a voice framework comprises the steps of initializing a timer in a time control register; saving context information associated with a function to a predetermined context memory location; updating a program counter of an interrupted line of a code, for comparison with a previous value of the program counter; generating an interrupt for each line of code of the function based on an expiration of the timer; and using a stack pointer value to fill a scratch memory location with a fill pattern, associated with a called function.

Other aspects of the embodiment of the present invention may include the step of updating at least one counter to account for at least one extra clock cycle; wherein the counter indicates the number of times an instruction has been at a particular program counter address; further comprising the step of clearing any pending timer interrupts; further comprising the step of restoring the stack pointer value; further comprising the step of setting the timer to enable a next interrupt to occur after a next instruction is processed for comprehensive test coverage; wherein the context information comprises at least one variable that is required for a subsequent call to the function; further comprising the step of determining a time interrupt, wherein if a time interrupt is detected, a period register of the program counter is decremented, else the period register of the program counter is initialized to a maximum 16-bit value; wherein the context information comprises at least one of status registers, general purpose registers and stack pointers.

According to another embodiment of the present invention, a method for testing a voice algorithm module for compliancy in a voice framework comprises the steps of: verifying an interrupt service routine is running; saving a value of a timer register as a temporary value; saving context information associated with a function to a predetermined context memory location; updating a program counter of an interrupted line, for comparison with a previous value of the program counter; using a stack pointer to fill a scratch memory location with a fill pattern, associated with a called function; and subtracting the temporary value of the timer register from an initial time value to determine a latency value.

Other aspects of the present invention may include the step of clearing any pending timer interrupts; the step of restoring the stack pointer value; the step of setting the timer to enable a next interrupt to occur after a next instruction is processed for comprehensive test coverage; wherein hardware supporting the voice algorithm comprises at least two timers; wherein the latency value is used to determine the duration of an instruction; wherein a maximum latency value is set to 66 cycles; wherein a maximum latency value is set to 42 cycles; and wherein context information comprises at least one variable that is required for a subsequent call to the function.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which.

DETAILED DESCRIPTION OF THE INVENTION

The following description is intended to convey a thorough understanding of the invention by providing a number of specific embodiments and details involving compliancy testing applications. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
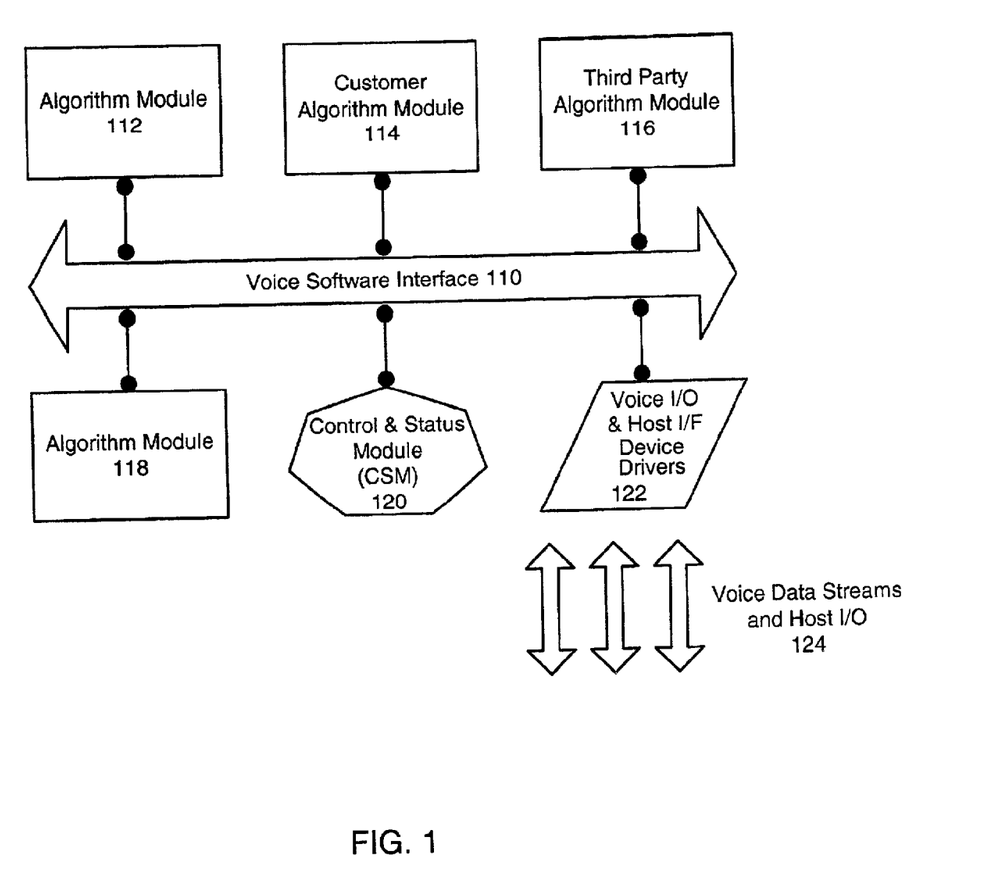
FIG. 1 illustrates an example of a voice software interface, according to an embodiment of the present invention.

FIG. 1 illustrates an example of a voice software interface, according to an embodiment of the present invention. The key to a portability and scalability voice software may be found in a highly modular and efficient software architecture. A voice software interface 110 may communicate with a variety of modules, such as algorithm modules 112 and 118, customer algorithm module 114, third party algorithm module 116, a control & status module (CSM) module, a voice input/output and host interface device drivers 122, which may communicate with voice data streams and host input/output 124. Other modules and applications may be further supported by interface 110.

An application that is voice software compliant may be partitioned into a plurality of modules, which may include algorithm modules 112 and 118, a Control/Status Module (CSM) 120; and input and output (I/O) drivers 122, for example. The system of FIG. 1 presents a framework for implementing various functions provided the functions adhere to interface specifics. The voice software may be designed to be extensible, allowing additional voice processing algorithms to be plugged into the interface as application's needs increase or change.

Algorithm modules 112, 118 perform various types of operations on voice signals, such as speech detection, Dual Tone Modulation Frequency (DTMF) tone detection, and speech compression. Modules may also include modules written by a customer, a third party vendor or other sources. In addition, algorithm modules are capable of operating on multiple voice channels concurrently.

The CSM 120 controls and schedules voice I/O operations, runs the algorithm modules, and exchanges command and status information. The CSM is responsible for controlling and scheduling a variety of voice processing algorithms for different voice ports. Different combinations of algorithms may be scheduled for different voice ports at any time. The CSM 120 may also be designed for a specific system.

The I/O drivers, which may include Voice I/O and Host Interface (I/F) device drivers 122, are responsible for marshaling incoming and outgoing data for one or more voice ports as desired. This allows the CSM 120 to manage data acquisition modules and host communications.

A set of interface specifications and design guidelines for various system functions may be designed in a voice software to ensure seamless integration of the software modules. These specifications and guidelines may include Digital Signal Processing (DSP) to host communication; voice data I/O to and from the DSP; inter-module communication; memory usage by each module; control and schedule of algorithms; voice I/O and/or other functions.

Modules are highly efficient in use of memory and CPU resources to ensure maximum utilization of the DSP hardware. This design element minimizes system and other costs. The voice software may not use a real-time executive or a kernel. The voice software architecture may not impose requirements on the use of interrupts. However, where appropriate, guidelines for using the voice software with a multi-tasking kernel may be provided.

Within the voice software framework there are various types of data that may be communicated, such as command and status information, voice port data, data objects and/or other data.

In voice processing systems, the DSP is generally controlled by another processor, such as a microcontroller, a host computer or other device, termed the "Controller" in the interface. In simple stand-alone systems, for example, the DSP may perform the functions of the Controller. The CSM design guidelines may be extended in the case of a microcontroller or host computer acting as the Controller.

Command and status data may be communicated between the Controller and the CSM. Command and status data may be transmitted at relatively infrequent intervals, for example, changing on the order of seconds, minutes or other interval.

Figure 2:
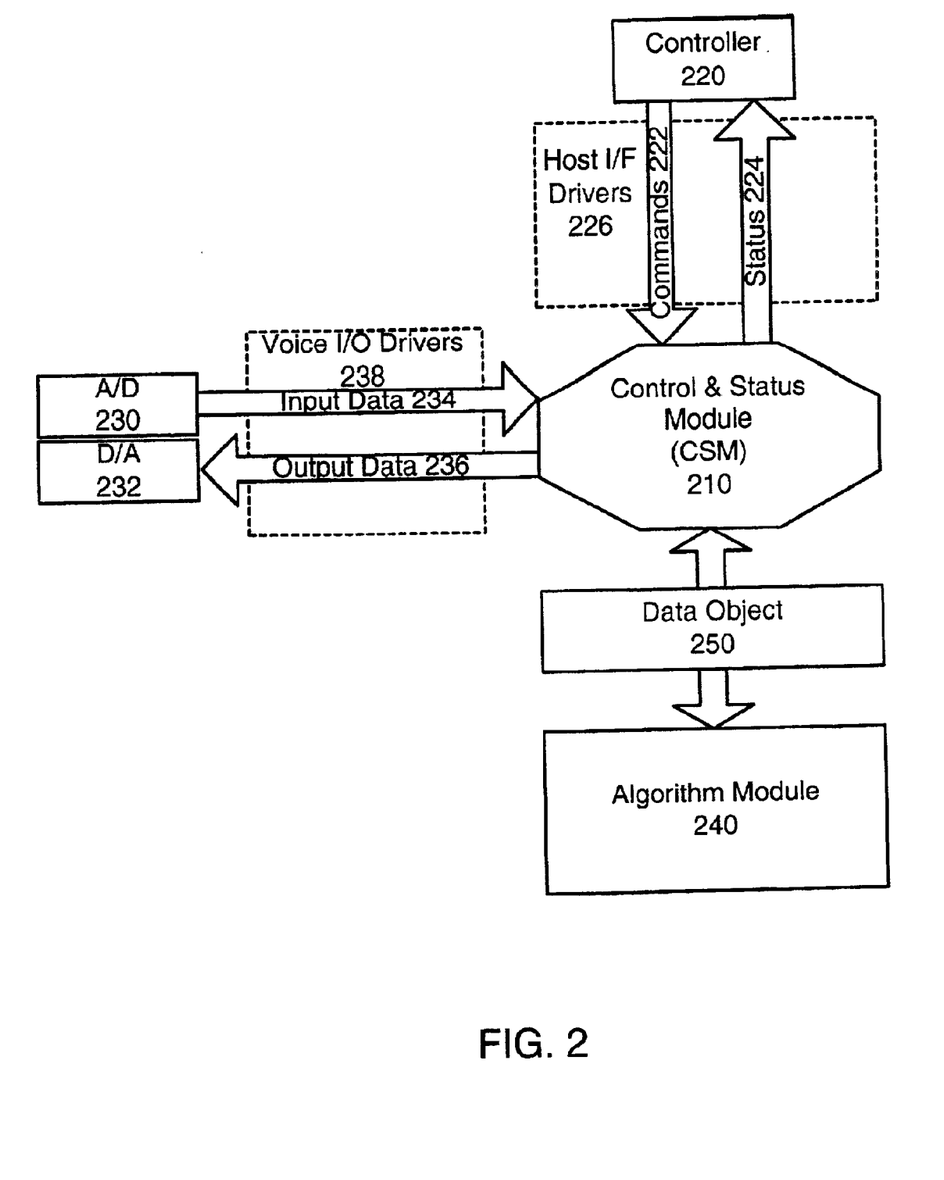
FIG. 2 illustrates an example of a communication system, according to an embodiment of an aspect of the present invention.

As illustrated in FIG. 2, the CSM 210 may receive commands 222 from the Controller 220 through the Host I/F drivers 226. The commands 222 sent from the Controller 220 may dictate which of the algorithm modules 240 should be run on a specific voice port data. The CSM 210 also puts status 224 through the Host I/F drivers 226 to the Controller 220. Status data 224 may include the progress of the algorithm module (e.g., DTMF digit detections, echo canceller status, speech detections, etc.). In addition, more than one algorithm may operate on a voice port at a time.

Since DSP chips are more efficient at processing blocks of data rather than single samples, voice port data flows through the system in fixed blocks of data, such as blocks of 5 millisecond (msec) to 30 msec, depending on the application and/or other factors. That is, each block of data may include 40 to 240 samples of data, for example, collected from a signal sampled at approximately 8 (kilohertz) kHz.

The Voice I/O drivers 238 may exchange voice port data between the data acquisition devices (e.g., A/D 230, D/A 232, etc.) and the CSM 210. Voice I/O drivers 238 may support input data 234 from A/D 230 to CSM 210 as well as output data 236 from CSM 210 to D/A 232.

A mechanism used for communication in the voice software interface may include a data object 250. The data object 250 may include context information for an algorithm and a specific voice port, for example. Context information may include a pointer to the input data, a pointer to the location to store the output data, and any additional parameters. The CSM 210 may update this information in the data object 250 and pass the information to an appropriate algorithm module 240. The algorithm may perform a voice processing function and pass the data object 250 back to the CSM 210. The CSM 210 may then pass the status, as shown by 224, from the data object 250 to the Controller 220.

Modules may be designed to support multitasking processing models. Each task may be assigned a particular scratch space, which may be required for the modules that may run (or execute) in that task. This allows algorithm modules to be preempted without having to save its scratch space, as further detailed below.

Within each task, the DSP processes data in fixed-length blocks, from 5 to 30 ms long (40 to 240 samples), for example. Other blocks of varying lengths may also be used.

The sequence of DSP algorithms through which a block is processed is called a state. Most applications may use several different DSP states. States may be application-specific and reflect the purpose of the algorithm. For example, states may include IDLE, PLAY, and RECORD. In each state, the DSP performs a series of actions appropriate for a particular state.

The commands 222 from the Controller 220 may cause the CSM 210 to change the state of the DSP, thereby effectively changing which group of algorithm modules are running. The Controller 220 may issue new commands at any time, whereas the CSM 210 may be restricted to changes in the state of the DSP on block boundaries.

For each state, the CSM 210 reads data from the appropriate devices, executes the proper modules, writes data to device(s), and writes the status to the Controller 220. The voice software architecture may be re-usable, placing minimal constraints on the underlying hardware thereby accommodating a wide variety of systems. This portability of the voice software interface minimizes recurrent engineering and product design cost. Examples of constraints placed on DSP memory may include customary requirements of any real-time system design. For example, there should be sufficient memory for program and data and the memory should be fast enough to achieve real-time performance.

Since voice processing algorithms are constantly evolving and individual customer requirements vary, it is important that the voice software interface provides a method for allowing independently developed algorithms to be integrated into a single system. In order for each algorithm to function properly in a compatible system, the algorithms are coded into modules that conform to the specified requirements. These requirements may be categorized into processor-dependent and processor-independent specifications, for example.

Each module may include at least two functions, such as a header file and a data object. The two functions may initialize the object and perform the algorithm itself. The header file may function to prototype and provide information about the data object. The data object, which may include a C structure, for example, may function to preserve context information that may be required to be maintained between calls to the algorithm (e.g., filter histories, counters, etc.).

Since many DSP chips are supported by C compilers, the two functions are C callable. Other compilers may be implemented accordingly. This allows a system integrator to write control code in C while taking advantage of modules that have been optimized in assembly language. For example, if assembly language is used for a control code, the modules may still be used. The assembly language user may follow the C calling conventions to use the modules.

The header file supplied as part of the module may provide specific information as to the location of public members within the data object. Examples of public members may include a pointer to the input data buffer, a pointer to the output data buffer, status results, and/or other information.

A particular feature of the modules is that they are re-entrant, which means they do not contain global or static variables. The object may contain static information. Since the module may directly access on-chip dual port memory, the voice software preserves re-entrancy by considering this memory to be part of the task's context for multitasking environments.

Communication between modules may be handled by passing objects. Consider the example of two modules, XXX and YYY, where module XXX needs member3 of module YYY. The XXX function that performs the algorithm, XXX_func( ), may have the following prototype:
  void XXX_func(XXX_Obj*XXX_obj, YYY_Obj*YYY_obj);
The function XXX_func( ) may reference member3 as follows:
  local_var=YYY_obj.member3;
By convention, functions may read the members of another module's data object, but cannot modify them. An exception is that the system control code may modify members of the object during initialization.

Although modules do not directly manipulate interrupts, interrupt service routines (ISRs) may be blocked from executing when the algorithm module is executing a particular loop (e.g., a RPT or RPTZ loop). Since this affects interrupt latency, the convention is to limit loops of this type to approximately 66 instruction cycles or less for compatibility.

Various TMS320C54x (C54x) processors, for example, have several kilowords of onchip dual-access RAM (DARAM). Kilowords generally refers to kilowords of memory that may be dependent on the particular chip being used. This onchip DARAM may be organized in blocks where each block may be approximately 2 kwords in size (e.g., 1 kwords block size on the '541), for example. The entire DARAM may be mapped to data space, and when the RAM overlay bit (OVLY) bit is set, the DARAM above 80h may also be mapped to program space. OVLY enables on-chip dual-access RAM to be mapped to program space.

The voice software specification may define a mechanism for allocating on-chip memory for use by algorithm modules. Algorithm modules on the C54x may require at least two types of DARAM memory sections, such as general purpose (e.g., unaligned) memory and aligned memory, for example.

General purpose (unaligned) memory may be used to enable the algorithm to run efficiently by using fast DARAM for temporary storage (e.g., scratch memory) of context and local variables. The modules may use the C stack for this function (assuming the C stack is in DARAM for optimal performance). In addition, the modules may be configured to use a block of memory separate from the C stack. This enables an application developer to place the C stack in SARAM (single-access RAM) and allocate a smaller portion of the DARAM for unaligned scratch memory.

For aligned memory, algorithm modules that use circular addressing may require that some of the scratch memory be appropriately aligned. This is a TMS320C54x requirement on circular addressing, for example. When allocating this memory, an application developer may align it to fall on a N-bit boundary, where N relates to the size of the section S in 16 bit words as shown by $N > \log_2 S$. Algorithm modules that require aligned memory sections may define the amount of memory needed per aligned memory section in the module's header file.

Figure 3:
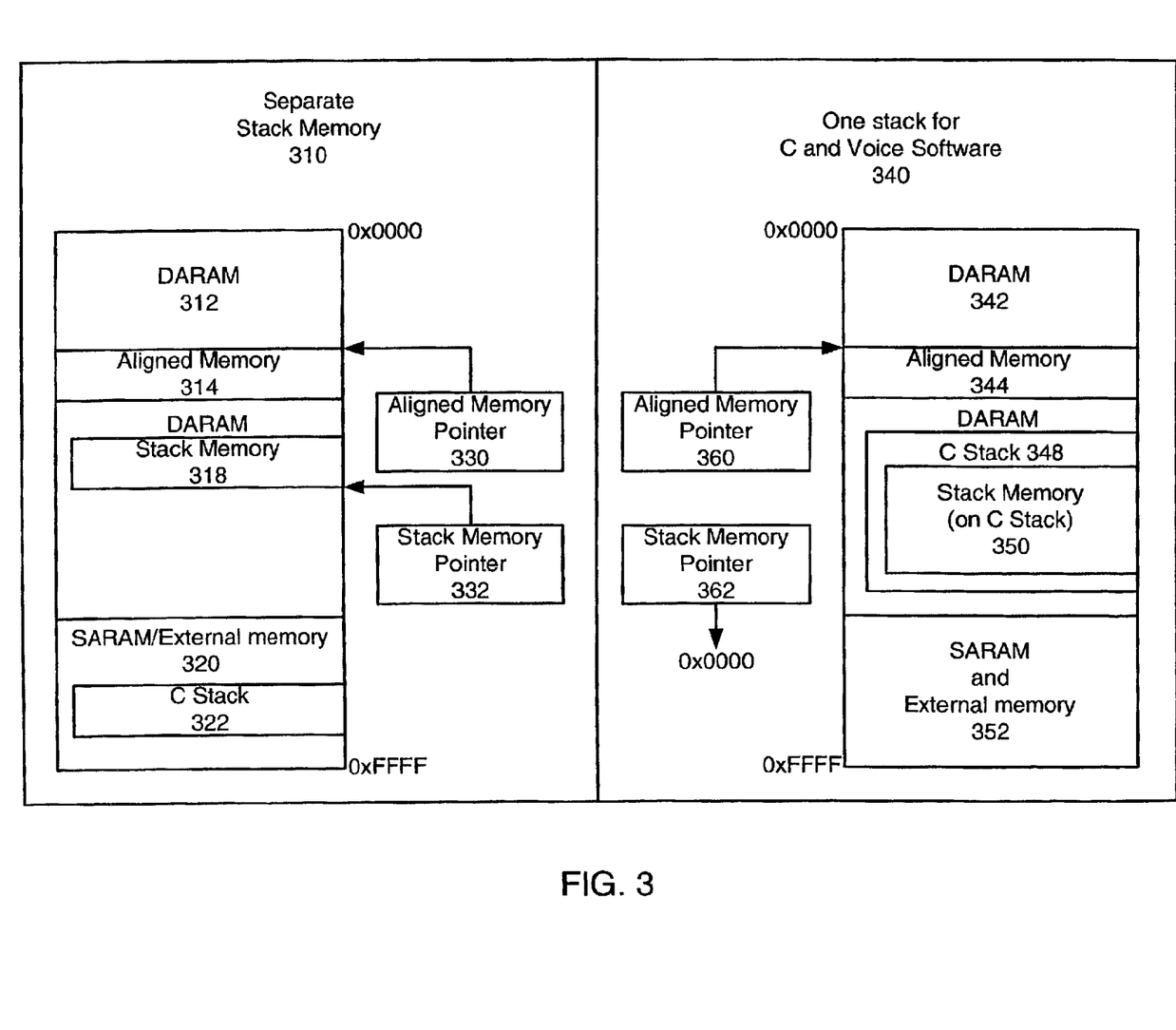
FIG. 3 illustrates two approaches to allocating scratch memory for algorithm modules, according to an embodiment of the present invention.

FIG. 3 illustrates approaches to allocating scratch memory for algorithm modules, according to an embodiment of the present invention.

According to one approach 310, a DARAM 312 memory section is allocated separate from the C stack 322 for unaligned scratch memory. C stack 322 may be supported by SARAM/External memory 320. The stack memory pointer 332 used to initialize the modules is set to the bottom of memory 318. Although more complicated, this approach uses less DARAM. If desired, an optional aligned memory 314 may be allocated. An optional aligned memory pointer 330 may be set to the top of memory 314.

According to another approach 340, a larger C stack 348 is allocated and placed in DARAM 342. For example, a stack memory pointer 362 used to initialize the modules is set to NULL (e.g., 0x0000) to indicate that the C stack 348 should be used by the modules for unaligned scratch memory, as indicated by 350. If desired, an optional aligned memory 344 may be allocated. An optional aligned memory pointer 360 may be set to the top of memory 344. SARAM and external memory are represented by 352.

Memory in the general purpose and the aligned memory sections may be considered to be scratch memory and are generally not preserved across function calls. In some cases, algorithm modules that are executing in the same task may share the general purpose and aligned memory sections. Therefore, the memory sections should be large enough to support the largest usage by an individual module in a given task. Other parameters may be used to determine memory size. If a multitasking kernel is used, separate general purpose and aligned memory sections may be allocated for each task. Otherwise, modules may be limited to a single task.

The C compiler may place global constants in a .bss section, which may refer to an uninitialized section created by the C compiler reserved for global and static variables, for example. Although assembly language functions may use the same mechanism, global constants used exclusively by assembly language routines may reside in a data section. Global constants that are to be shared with C routines may use the .bss section.

Figure 4:
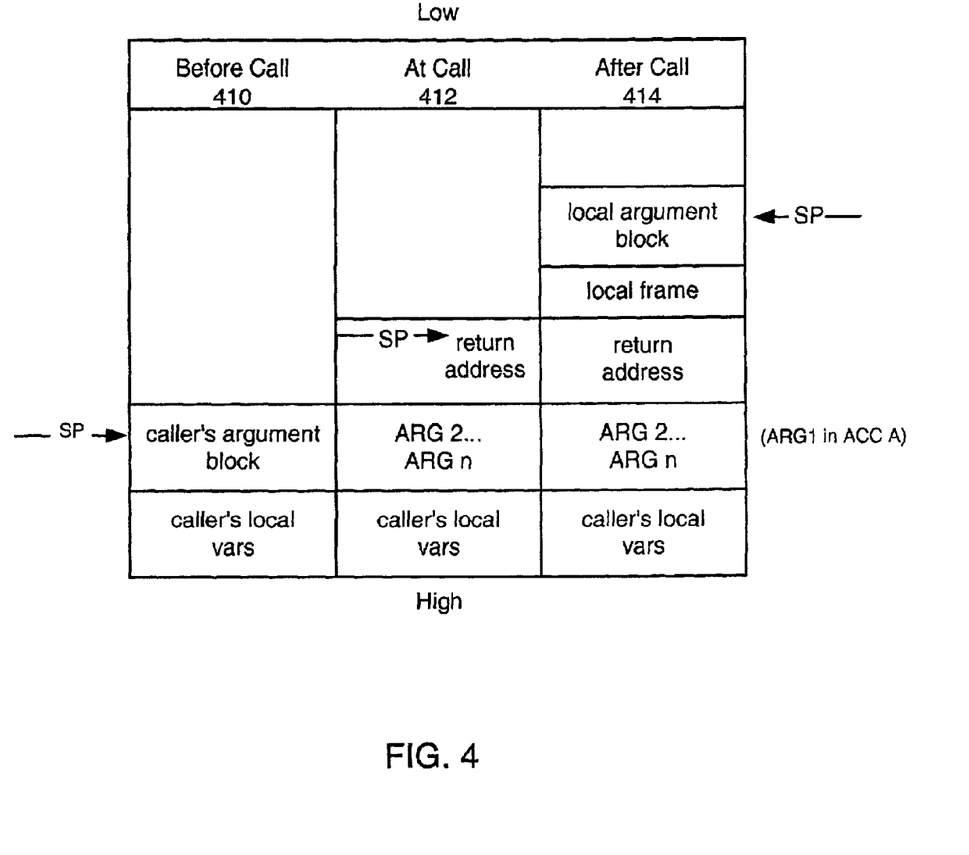
FIG. 4 illustrates an example of a stack frame of a C routine.

DSP functions that are called by, or that call, C functions may use the C compiler calling conventions. Arguments may be passed between functions using the accumulator A (for the first calling argument) and the software stack. The stack frame of a typical C routine is illustrated in FIG. 4. This figure diagrams the stack layout prior to the function call 410, at the function call 412, and after the function 414 has set up its frame.

Each DSP function may pass or be passed by at least one argument, such as the pointer to its object. The object encapsulates any port-specific activity including a pointer to the block of input data and a pointer to a block where the output data is to be placed. The structure of the object may be dependent upon the DSP function and may be documented in the module's header file.

The present invention provides a test procedure for ensuring that the voice software algorithms perform correctly within a framework. Other types of algorithms may also be tested by the compliancy tests of the present invention. The test procedure checks for compliance and reports events based on analysis.

Figure 5:
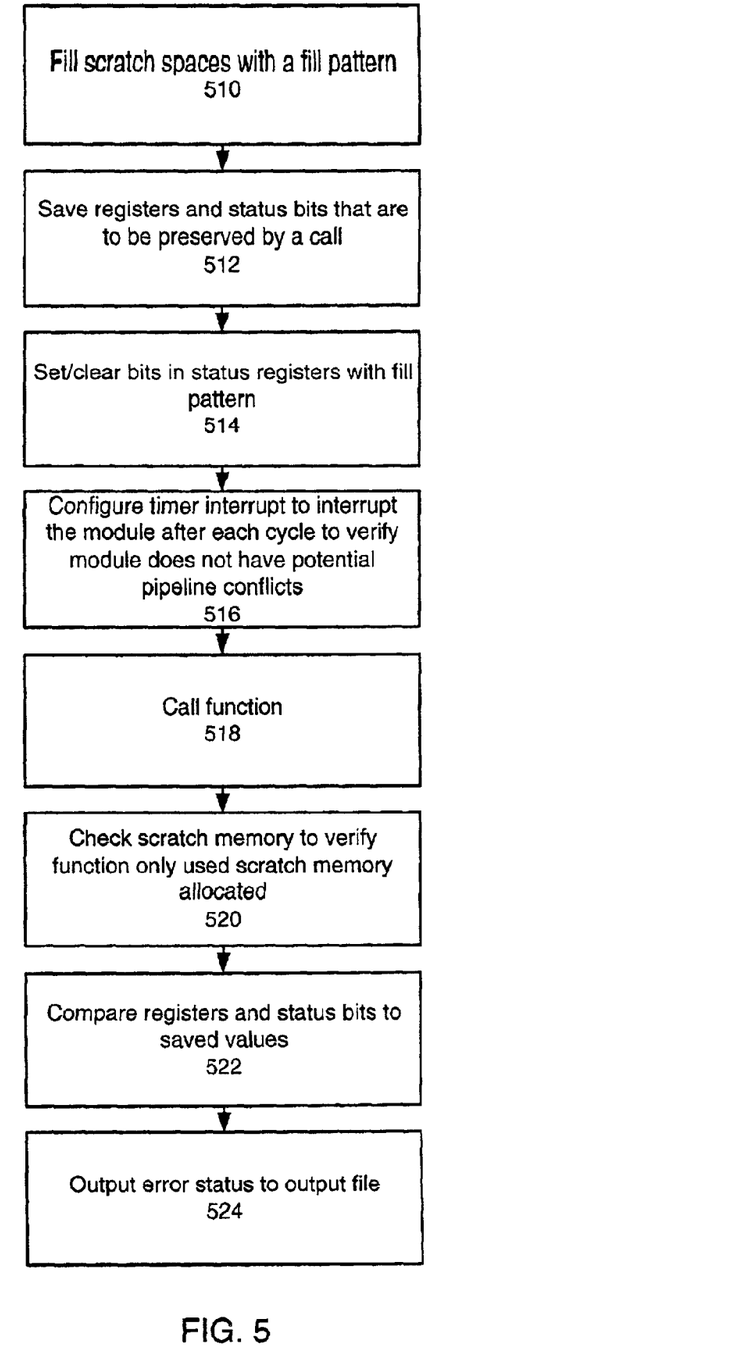
FIG. 5 is a flowchart illustrating a compliancy test, according to an embodiment of the present invention.

FIG. 5 illustrates a compliancy test, according to an embodiment of the present invention. At step 510, scratch spaces of a scratch memory, associated with a function to be tested, are filled with a pattern so that an algorithm module cannot depend on any remaining residual context information. At step 512, registers and status bits that are to be preserved (e.g., bits that should not be changed) by a call to a function, such as a voice software compliant function, are saved. At step 514, a fill pattern is used to set (or clear) bits in status registers whose state cannot be presumed by a C-callable function. At step 516, a timer interrupt is configured to interrupt the module after each cycle to verify that the module does not have any potential pipeline conflicts. A conflict may arise when executing instructions in an assembly-line fashion. At step 518, a call to the function is made. At step 520, the scratch memory is checked to verify that the function used the allocated scratch memory. At step 522, registers and status bits that should not be changed by a call to the function are compared with corresponding saved values. At step 524, if any of these tests fail, then the compliancy test reports the test number (or other identifier or description) of the failure. Error status from the compliancy test may be written to a separate output file.

Figure 6:
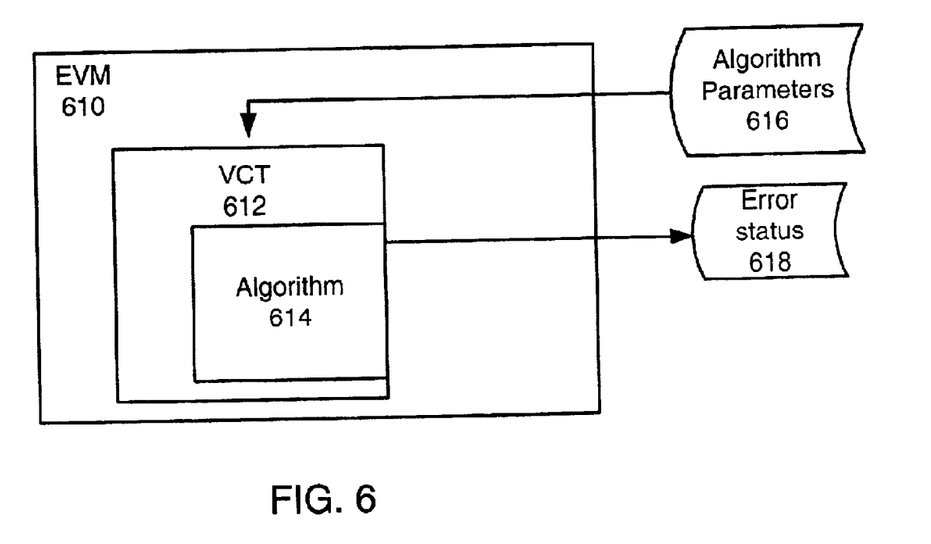
FIG. 6 is an example of a test configuration of a compliancy test, according to an embodiment of the present invention.

FIG. 6 shows a test configuration for a compliancy test, according to an embodiment of the present invention. Evaluation Module (EVM) 610 may support a voice software compliancy test (VCT) 112, which in turn may support at least one algorithm 614. As shown by 616, algorithm parameters may be provided to the VCT 612. When test procedures are executed and if an error is detected, the specifics of the error may be written to an error status file, as shown by 618.

The compliancy test of the present invention described above may be executed for each fill pattern (e.g., 0x0000, 0xFFFF, 0x8000, 0x7FFF, etc.). This may be performed for modules that are configured to use the C-stack, a separate voice software stack or other stack.

In addition to the above test, a test of local parameter legal ranges may be performed. A local parameter structure may be loaded with values greater than and less than an allowable range for each parameter. The module's object may be checked after an initialization function to assure that the closest legal values (e.g. values within a predetermined range) have been assumed.

According to an embodiment of the present invention, a plurality of modes of operation may be invoked when performing compliancy tests. Modes of operation may include one or more of a Memory Test, an Interrupt Test and/or a Latency Test. A combination of tests may also be implemented. Other compliancy tests may also be supported by the present invention.

Figure 7A:
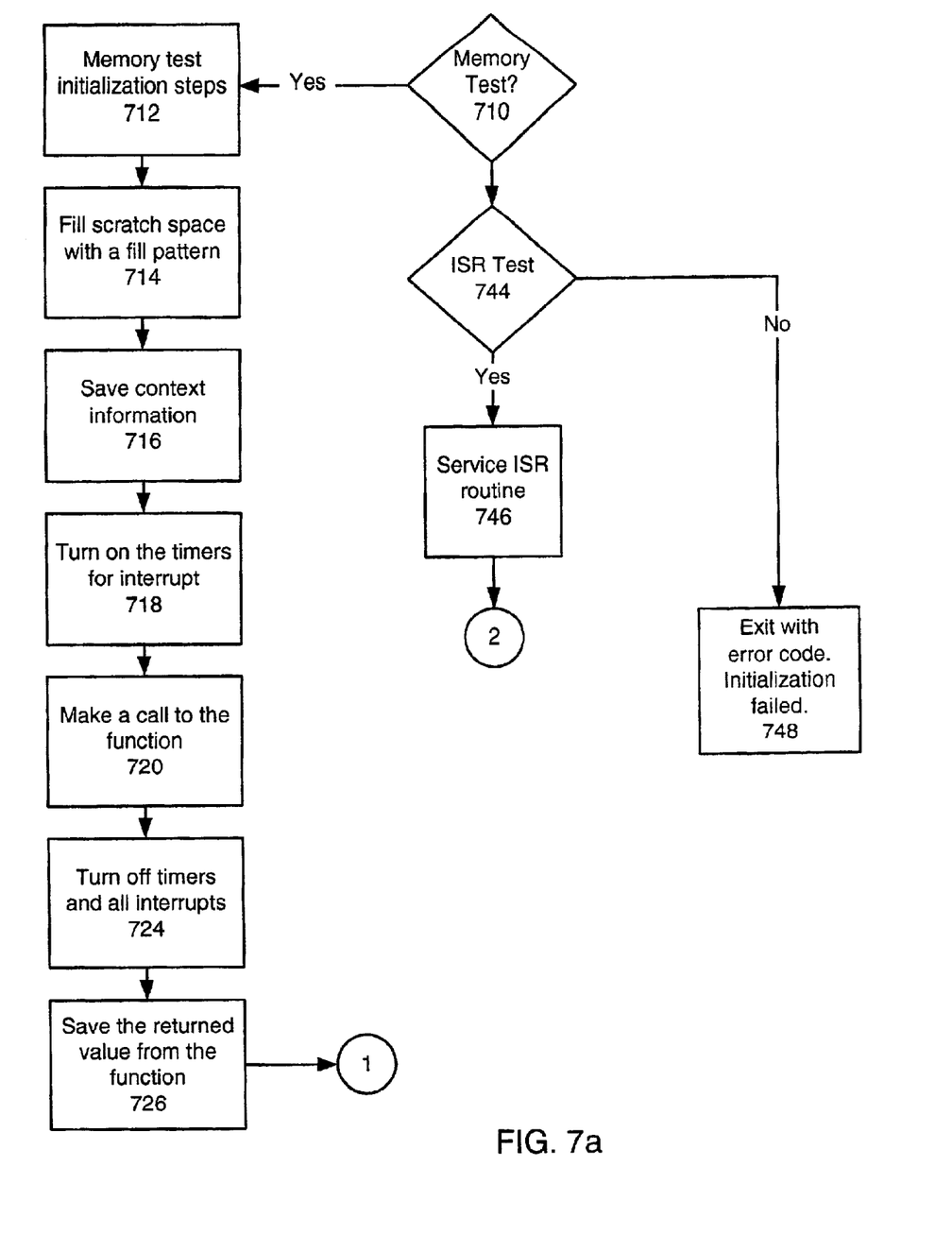
FIG. 7 is a flowchart illustrating a memory compliancy test, according to an embodiment of the present invention.
Figure 7B:
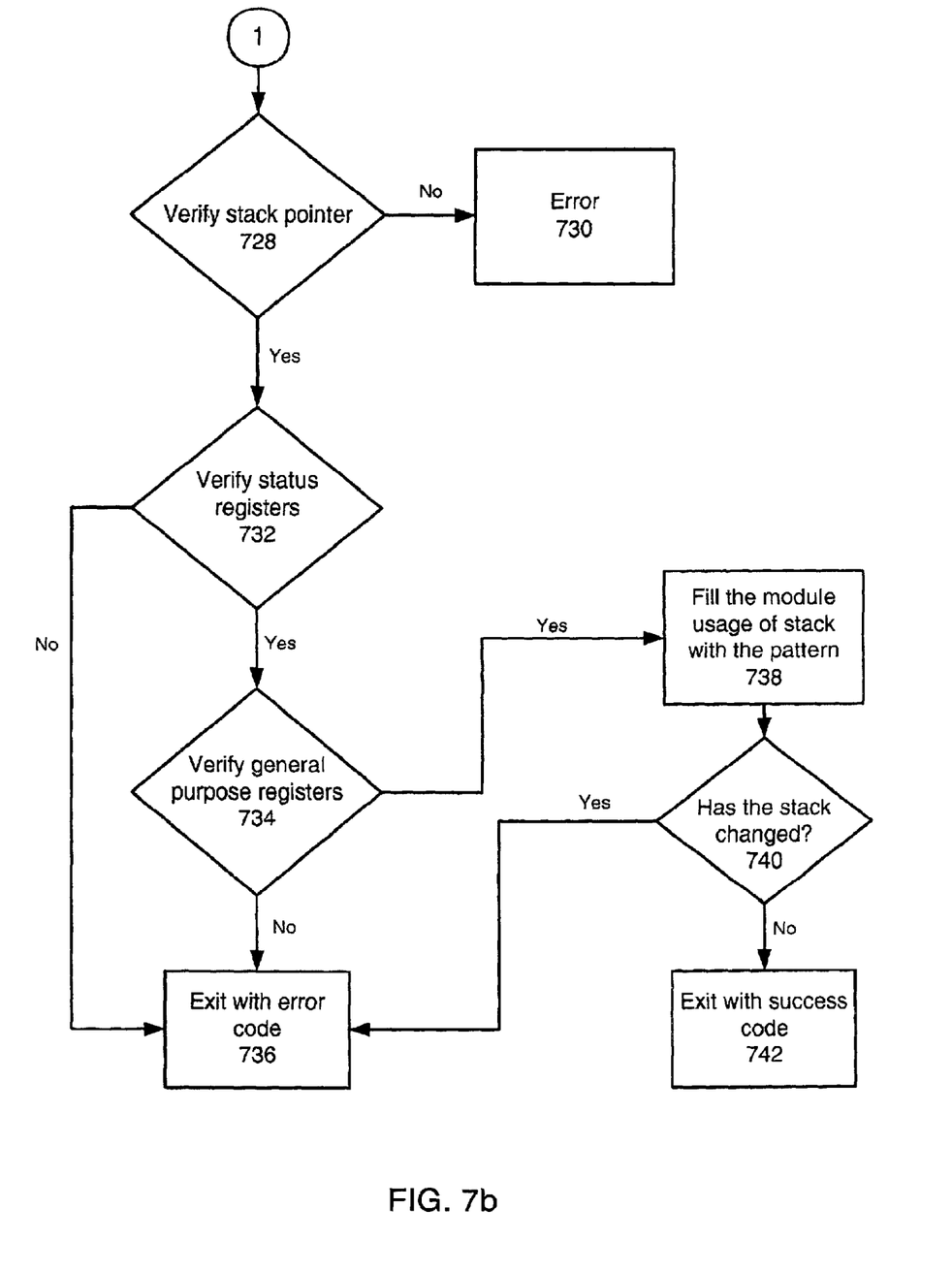
Figure 8:
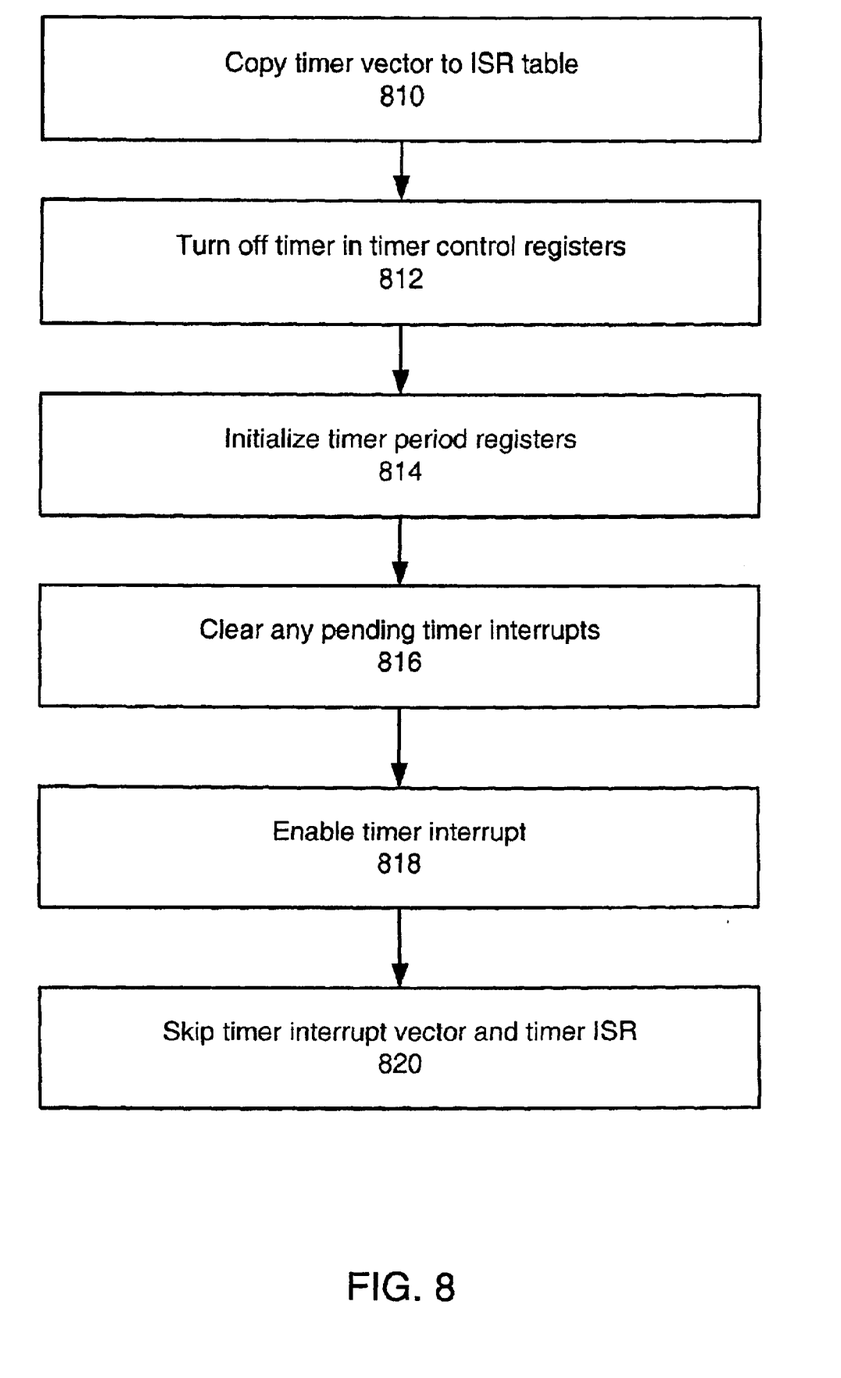
FIG. 8 is a flowchart illustrating memory test initialization steps, according to an embodiment of the present invention.
Figure 9:
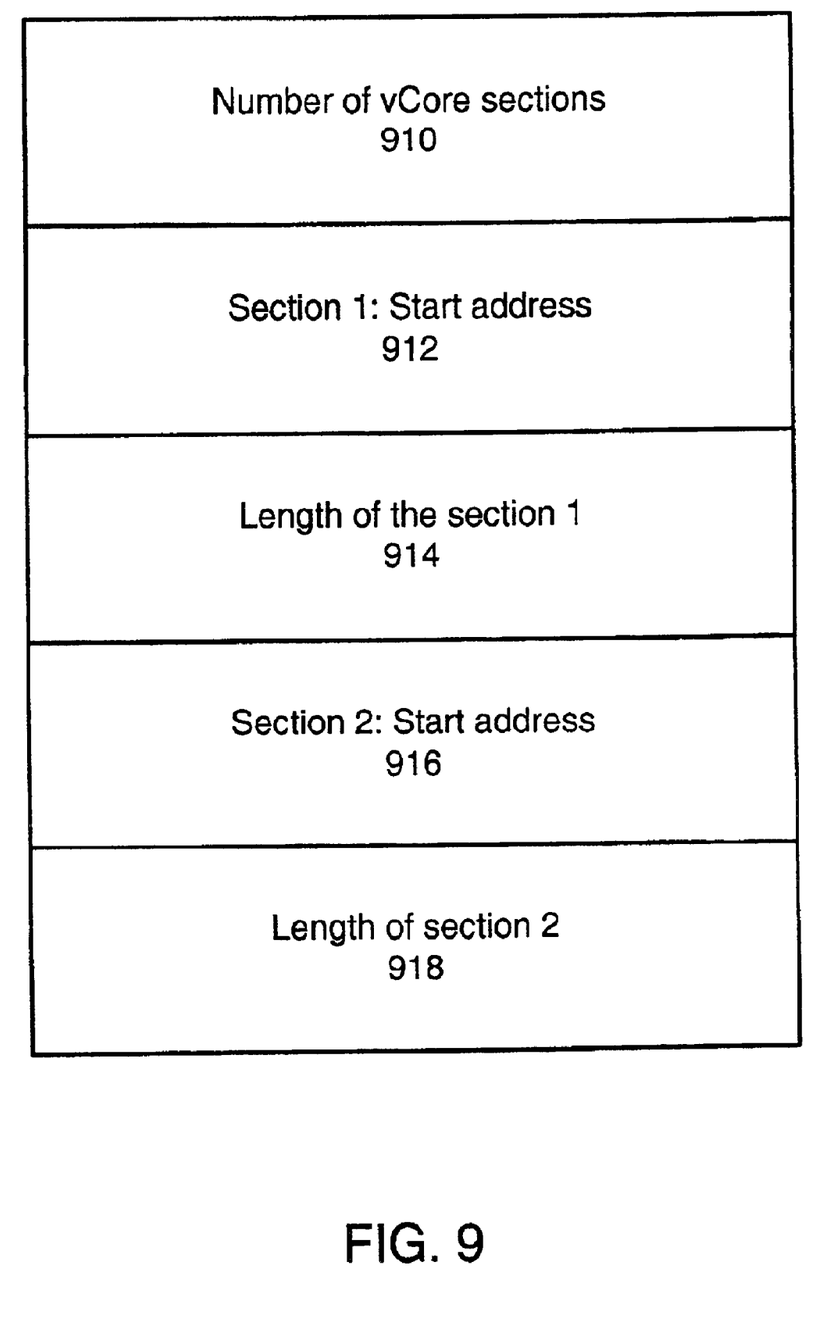
FIG. 9 is an example of a test routine, according to an embodiment of the present invention.

FIGS. 7–9 illustrate flowcharts describing the above tests, according to embodiments of the present invention. The latency test is available if at least two timers are present on the hardware (e.g. TMSC5402). Also, the latency test may be executed when the interrupt test is executed. Memory test and the interrupt test may be executed simultaneously. Other variations may be implemented.

A control word may be selected based on the type of test desired. For example, functions may include measuring latency, checking for pipeline conflicts or checking for memory overwrite.

For example, a format for reading the control word may include the following commands:

Bit0: Latency check required (0 or 1).

Bit1: Run timer interrupt service routine? (0 or 1).

Bit2: Run Memory Fill Test? (0 or 1).

where, 1 is True and 0 is False.

Initial steps may include allocating stack space for voice software variables and initializing test variables to have appropriate fill patterns (e.g., 0x0000, 0xFFFF, 0x8000, 0x7FFF, etc.).

FIGS. 7a and 7b illustrate the steps of a voice software compliancy test, according to an embodiment of the present invention. At step 710, a memory test may be invoked. At step 744, an interrupt service routine test may be invoked. At step 746, ISR routine may be serviced when the interrupt service route (ISR) test is invoked. Otherwise, the compliancy test may be exited when an error code indicating initialization failure, at step 748.

According to an example, the memory test and the interrupt test may be run separately based on the value in the control word. In another example, the memory test may be run with the interrupt test. For the memory test, initialization steps may be performed, as shown in FIG. 8. At step 810, a timer vector is copied to the ISR table. At step 812, a timer in timer control registers is turned off. At step 814, timer period registers are initialized. At step 816, any pending timer interrupts are cleared. At step 818, the timer interrupt is enabled while the timer is still turned off. At step 820, the timer interrupt vector and timer ISR are skipped over.

After performing the above-mentioned initialization steps at 712, as illustrated in FIG. 8, a scratch space is filled with a fill pattern, associated with a function to be called, at step 714. The test routine may give this information in the form of an array and set a pointer to the array, as shown in FIG. 9. As shown, the number of sections is provided at 910; a section 1 start address is provided at 912; length of section 1 is provided at 914; a section 2 start address is provided at 916; and length of section 2 is provided at 918. Additional sections may be provided with corresponding pointers.

At step 716, context information is stored, before the call to the function is made. Context information may include information that should not be changed after the call to the function has been tested. Context information may include status registers that are to be preserved by the calling function, general purpose registers that are to be preserved by the calling function and other information.

For example, the stack pointer may be preserved (e.g., unchanged). This is tested by placing a predetermined number of patterns (e.g., three patterns) in a predetermined number of adjacent words (e.g., three adjacent words) on stack, and checking after the call that the predetermined words (e.g., three words) have the same relative address to the top (or other portion) of the stack.

At step 718, timers for interrupts are turned on. A call to the function to be tested (e.g., algorithm module) is made, at step 720. When the function returns, timers and interrupts are turned off, at step 724. At step 726, the returned value from the function is saved. At step 728, the stack pointer is verified as being restored correctly by testing the pattern that was placed before the call to the function, as shown in FIG. 7b. If the values are different, an error code is provided, at step 730. At step 732, status registers are verified as being preserved by the module where the module has preserved necessary status register bits. If the values are different, an exit operation may occur with an error code at step 736. At step 734, general-purpose registers are verified as being unchanged by the call to the function. If values are different, an exit operation may occur with an error code at step 736.

The function may be verified as only affecting (or changing) the scratch space allocated. For verifying that the appropriate scratch space was affected, the module usage of the stack may be filled with a fill pattern, at step 738. At step 740, it may be determined whether the stack has changed. For example, whether the entire space is equal to the test pattern may be verified. If the values are not equal, an exit operation may occur with an error code that signifies memory failed, at step 736. If values have not changed, voice software compliancy tests have passed where an error code may be set to 0 and returned, as shown by step 742.

Figure 10:
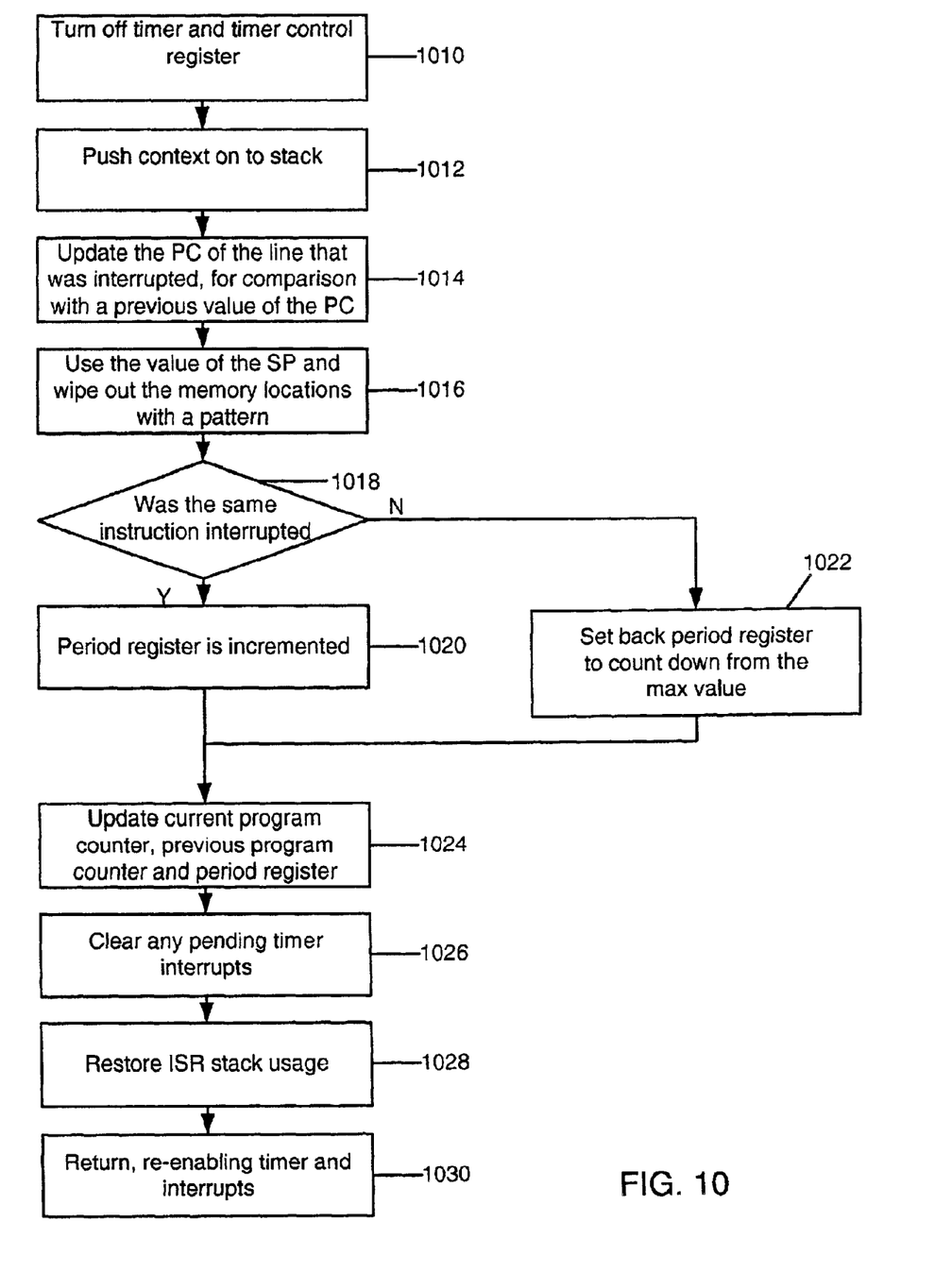
FIG. 10 is a flowchart illustrating an interrupt test, according to an embodiment of the present invention.

If the timer ISR is referenced at steps 744 and 746, as shown in FIG. 7a, the flowing steps are performed. FIG. 10 is a flowchart illustrating an interrupt test, according to an embodiment of the present invention. At step 1010, a timer in timer control register is turned off (or initialized). At step 1012, context information associated with a function is pushed onto a predetermined stack or memory location. At step 1014, a program counter (PC) of a line that was interrupted is updated for comparison with a previous value of the PC. At step 1016, the value of a stack pointer (SP) may be used to wipe out a plurality of memory locations with a fill pattern. At step 1018, it is determined whether the same instruction was interrupted. This is an indication that the timer interrupt is occurring. If so, then the period register is incremented at step 1020. Otherwise, the period register is set back to an initial value, at step 1022. One reason the period register is incremented at step 1020 is that, for instance, if period register is equal to the initial value and a multiple-cycle instruction is encountered, the timer will expire prior to execution of that instruction. Incrementing the period register when this happens will allow the timer to expire after that instruction is executed.

At step 1024, counters and/or registers are updated. For example, a current program counter, previous program counter and/or a period register may be updated. The presence of an interrupt causes extra clock cycles to occur due to the processing of the interrupt service routine. These extra cycles may be accounted for when setting the counters and timer register for setting up the next interrupt. At step 1026, any pending timer interrupts are cleared. At step 1028, the interrupt service routine's stack usage are restored. For example, the interrupt service routine restores the stack pointer prior to returning to the interrupted function (or algorithm module) under test. At step 1030, timers and/or interrupts are returned and/or re-enabled so that a next interrupt may occur after the next instruction in the main program is processed. For example, the timer may be set to interrupt the function (or algorithm module) under test exactly after the next instruction is executed to have complete or comprehensive test coverage.

The latency test may be executed when the ISR run is also being executed. The latency test may be invoked when the hardware supports at least two timers. The latency test may be used to determine how long a particular instruction (or set of instructions) is taking. If a particular instruction (or set of instructions) is lasting longer than a predetermined period of time (e.g., the instruction is taking too long), the latency test may be used to identify the particular code or other specifics. Thus, the amount of time associated with the instruction may be minimized.

Figure 11:
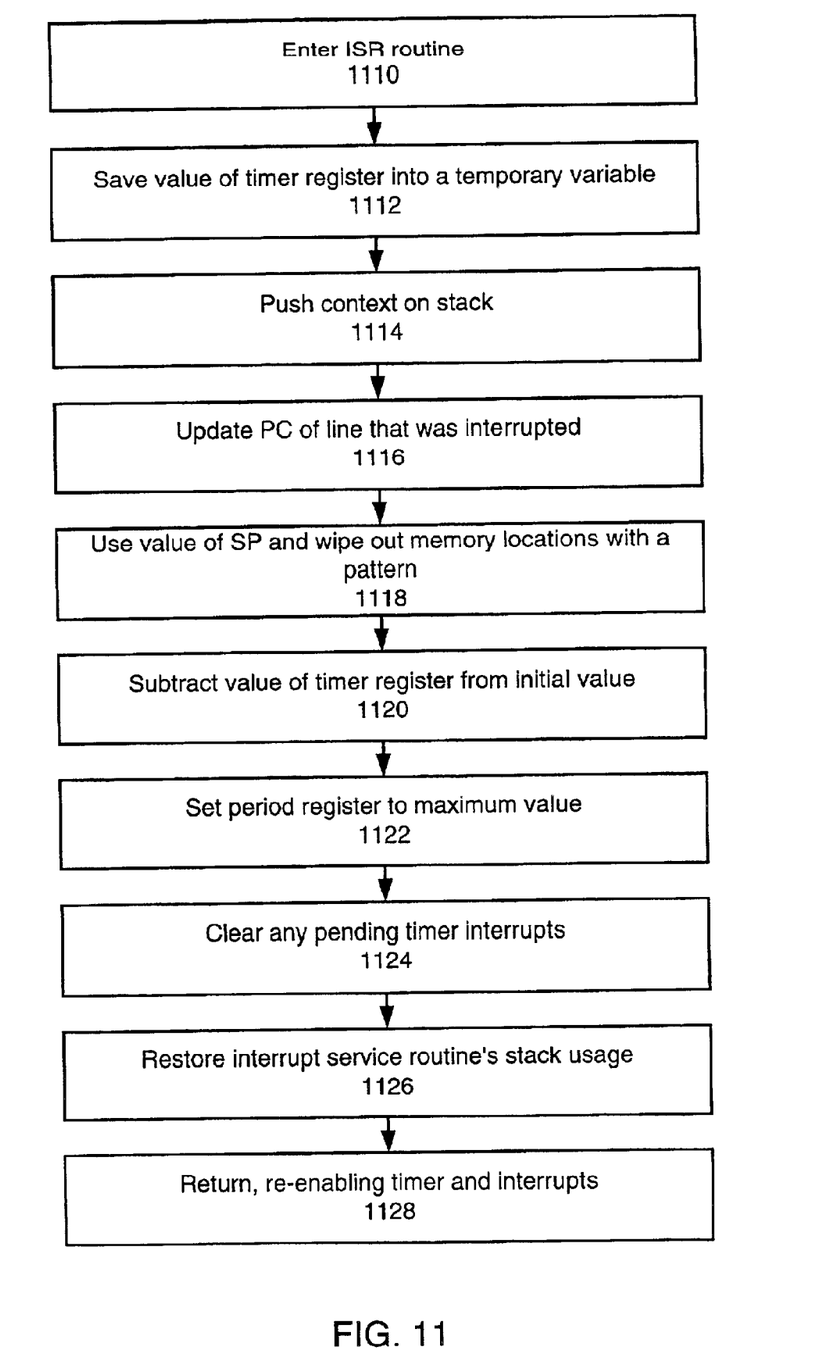
FIG. 11 is a flowchart illustrating a latency test, according to an embodiment of the present invention.

FIG. 11 is a flowchart illustrating a latency test, according to an embodiment of the present invention. At step 1110, an ISR routine may be entered, invoked or identified. As soon as the ISR routine is entered, the value of a timer register (used to measure latency) is saved into a temporary variable, at step 1112. At step 1114, context information is pushed onto a predetermined stack or memory location. At step 1116, a PC of a line that was interrupted is updated for comparison with a previous PC value. At step 1118, the value of a SP may be used to wipe out a plurality of memory locations with a fill pattern. At step 1120, the value of the timer register is subtracted from a predetermined value, such as an initial time. For example, a timer may start ticking down from 0xFFFE where the difference between the two provides a latency value. At step 1122, a first period register may be set to a predetermined value, such as a maximum value (e.g., 0xFFFF). At step 1124, any pending timer interrupts are cleared. At step 1126, the interrupt service routine's stack usage are restored. For example, the interrupt service routine restores the stack pointer prior to returning to the interrupted function (or algorithm module) under test. At step 1128, timers and/or interrupts are returned and/or re-enabled so that a next interrupt may occur after the next instruction in the main program is processed. For example, the timer may be set to interrupt the function (or algorithm module) under test exactly after the next instruction is executed to have complete or comprehensive test coverage.

The voice software discussed above may include Virata's vCore™ product. Virata's voice software, vCore™ is an object and source code software library proven in hundreds of applications around the world. Based on an open, flexible, and modular software architecture, vCore™ enables a system designer to provide an optimized and efficient custom solution with minimal development and test effort. Software modules associated with vCore™ are available for a wide range of applications including telephony functions, network echo cancellers, fax/data functions, voice coders and other functions.

Telephony functions of voice algorithm modules that may be incorporated in the system include: DTMF—Dual Tone Multi-Frequency generation and removal; MFD—Multi-Frequency Tone Detection; UTD—Universal Call Progress Tone Detection; FMTD—FAX and Modem Tone Detection Tone Generator—single, dual, and modulated; and VAGC—Voice Activity Detection with Automatic Gain Control. Network Echo Cancellers may include International Telecommunication Union (ITU) G.168—multiple reflector (up to 128 ms tail) and ITU G.168—single reflector (up to 48 ms tail). Fax/Data functions that may be incorporated in the system include caller ID, caller ID with call waiting, fax relay of T.38 and I.366.2, HDLC transmit/receive, and full-duplex speaker phone. Voice coders may include G.726, G.728—low delay coders; G.729, G.729A, G.729B, G.729AB, G.729E; G.723.1, G.723.1A; Global System for Mobile Communication GSM-EFR, GSM-AMR; G.722.1—audio coders; and proprietary coders. These functions or voice algorithm modules may be tested by one or more of the above mentioned compliancy tests.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for testing a voice algorithm module for compliancy in a voice framework, the method comprising the steps of:

filling a scratch memory location with a predetermined fill pattern associated with a function to be tested;

saving context information to a predetermined memory location, wherein the context information is specific to the function and is to be preserved for a call to the function wherein the context information comprises at least one variable required for a subsequent call to the function;

configuring a timer interrupt to interrupt the function after each cycle to minimize pipeline conflicts;

calling the function;

verifying context information by comparing a current version of the context information with the saved version of the context information; and writing an error code to an output file based on the verification of context information.

2. The method of claim 1, wherein context information comprises at least one of status registers, general purpose registers and stack pointers.

3. The method of claim 2 further comprising the step of placing a predetermined number of patterns in a predetermined number of adjacent words on the stack; after the call to the function, checking that the predetermined words have a same relative address to top of the stack.

4. The method of claim 1, wherein the step of verifying context information further comprises the step of verifying status registers by comparing status registers with saved context information.

5. The method of claim 1, wherein the step of verifying context information further comprises the step of verifying general purpose registers by comparing general purpose registers with saved context information.

6. The method of claim 1, wherein the step of verifying context information further comprises the step of verifying allocated scratch space was used by comparing the scratch space and the fill pattern.

7. The method of claim 1, wherein the fill pattern is a 16-bit pattern.

8. The method of claim 1, wherein pipeline conflicts arises when executing a plurality of instructions in an assembly line manner.

9. The method of claim 1, further comprising the step of performing memory test initialization steps.

10. The method of claim 1, further comprising the steps of:

saving a return value associated with the function; and comparing the return value with a plurality of known values of a maintained data file that represents correct values of the function called.

11. The method of claim 1, wherein the step of configuring a timer interrupt further comprises the steps of:

initializing a timer in a time control register;

updating a program counter of an interrupted line of a code, for comparison with a previous value of the program counter; and generating an interrupt for each line of code of the function based on an expiration of the timer.

12. A method for testing a voice algorithm module for compliancy in a voice framework, the method comprising the steps of:

initializing a timer in a time control register;

saving context information associated with a function to a predetermined context memory location;

updating a program counter of an interrupted line of a code, for comparison with a previous value of the program counter;

generating an interrupt for each line of code of the function based on an expiration of the timer; and using a stack pointer value to fill a scratch memory location with a fill pattern, associated with a called function.

13. The method of claim 12, further comprising the step of updating at least one counter to account for at least one extra clock cycle.

14. The method of claim 13, wherein the counter indicates the number of times an instruction has been at a particular program counter address.

15. The method of claim 12, further comprising the step of clearing any pending timer interrupts.

16. The method of claim 12, further comprising the step of restoring the stack pointer value.

17. The method of claim 12, further comprising the step of setting the timer to enable a next interrupt to occur after a next instruction is processed for comprehensive test coverage.

18. The method of claim 12, wherein the context information comprises at least one variable that is required for a subsequent call to the function.

19. The method of claim 12, further comprising the step of:

determining a time interrupt, wherein if a time interrupt is detected, a period register of the program counter is decremented, else the period register of the program counter is initialized to a maximum 16-bit value.

20. The method of claim 12, wherein the context information comprises at least one of status registers, general purpose registers and stack pointers.

21. A method for testing a voice algorithm module for compliancy in a voice framework, the method comprising the steps of:

verifying an interrupt service routine is running;

saving a value of a timer register as a temporary value;

saving context information associated with a function to a predetermined context memory location;

updating a program counter of an interrupted line, for comparison with a previous value of the program counter;

using a stack pointer to fill a scratch memory location with a fill pattern, associated with a called function; and subtracting the temporary value of the timer register from an initial time value to determine a latency value.

22. The method of claim 21, further comprising the step of clearing any pending timer interrupts.

23. The method of claim 21, further comprising the step of restoring the stack pointer value.

24. The method of claim 21, further comprising the step of setting the timer to enable a next interrupt to occur after a next instruction is processed for comprehensive test coverage.

25. The method of claim 21, wherein hardware supporting the voice algorithm comprises at least two timers.

26. The method of claim 21, wherein the latency value is used to determine the duration of an instruction.

27. The method of claim 21, wherein a maximum latency value is set to 66 cycles.

28. The method of claim 21, wherein a maximum latency value is set to 42 cycles.

29. The method of claim 21, wherein context information comprises at least one variable that is required for a subsequent call to the function.

* * * * *